United States Patent [19]
Perrotti

[11] Patent Number: 5,350,161
[45] Date of Patent: Sep. 27, 1994

[54] NUCLEAR REACTOR GRID STRIP CANTILEVER SPRING WITH NONUNIFORM MATERIAL CHARACTERISTICS

[75] Inventor: Patrick A. Perrotti, Newington, Conn.

[73] Assignee: Combustion Engineering, Inc., Windsor, Conn.

[21] Appl. No.: 973,609

[22] Filed: Nov. 6, 1992

Related U.S. Application Data

[63] Continuation of Ser. No. 660,805, Feb. 26, 1991, abandoned.

[51] Int. Cl.$^5$ .............................................. G21C 3/34
[52] U.S. Cl. .................................. 267/160; 267/181; 376/442; 376/462
[58] Field of Search ............... 267/158, 160, 163, 181; 376/261, 438, 462, 442; 72/53

[56] References Cited

U.S. PATENT DOCUMENTS

| | | | |
|---|---|---|---|
| 2,252,823 | 8/1941 | Wallace | 72/53 |
| 3,000,425 | 9/1961 | Hodges et al. | 72/53 |
| 4,678,632 | 7/1987 | Ferrari | 376/462 |
| 4,695,426 | 9/1987 | Nylund | 376/446 X |
| 4,770,847 | 9/1988 | Plaza-Meyer et al. | 376/444 |
| 5,024,426 | 6/1991 | Busch et al. | 267/158 |
| 5,024,810 | 6/1991 | Bachman | 376/442 X |

*Primary Examiner*—Robert J. Oberleitner
*Assistant Examiner*—Josie A. Ballato
*Attorney, Agent, or Firm*—Chilton, Alix & Van Kirk

[57] ABSTRACT

A metal component (10) having non-uniform material characteristics which cause the component to undergo differential growth upon exposure to a neutron flux, and a process for producing such a component. The invention is useful for making metal components for use in nuclear reactors, particularly fuel assembly cantilever grid springs (12). By cold working a portion (40) of a cantilever spring on the convex side of the curved region of the spring, a spring can be provided which has a smaller reduction in preload upon exposure to radiation than a conventional cantilever spring.

18 Claims, 2 Drawing Sheets

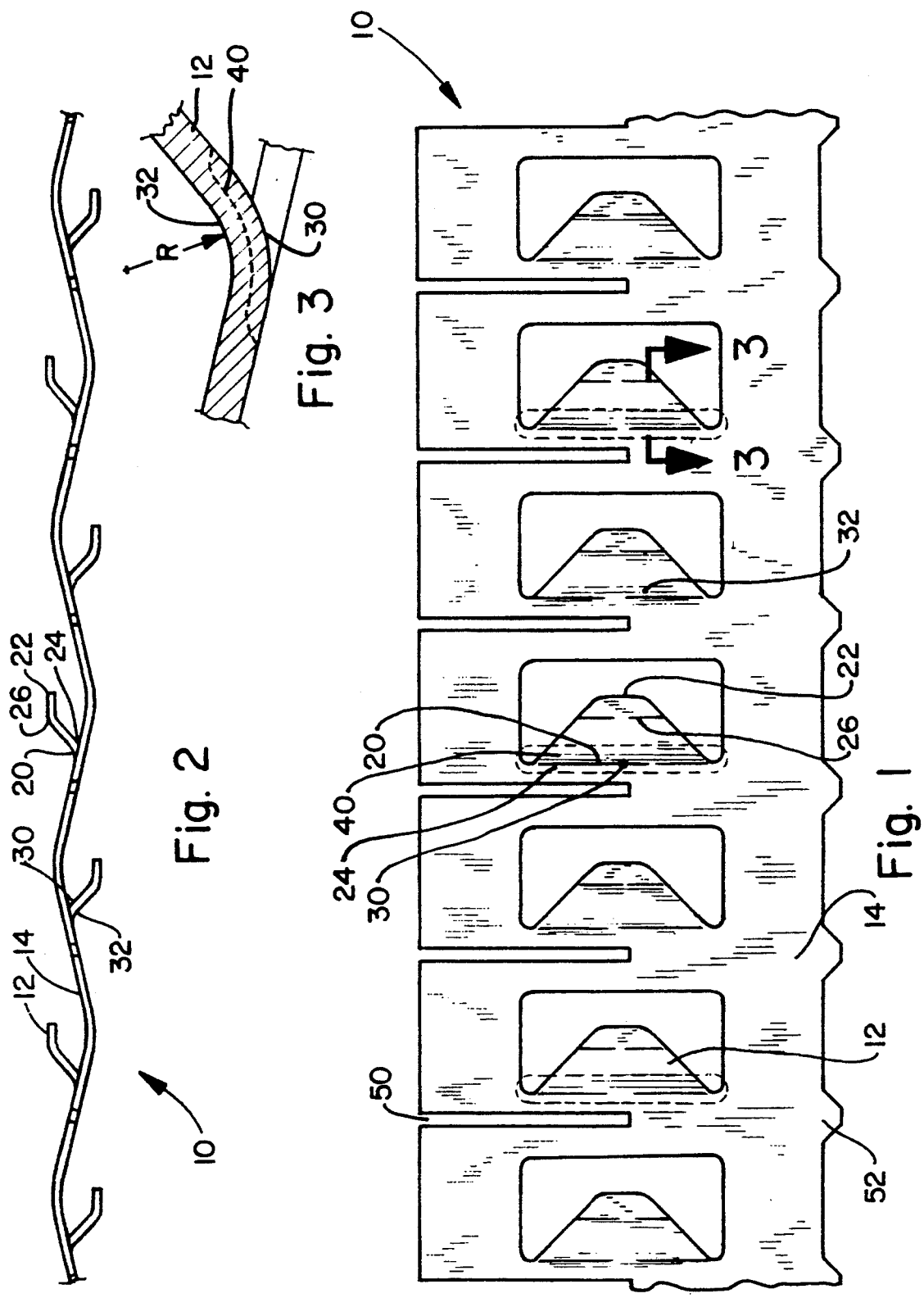

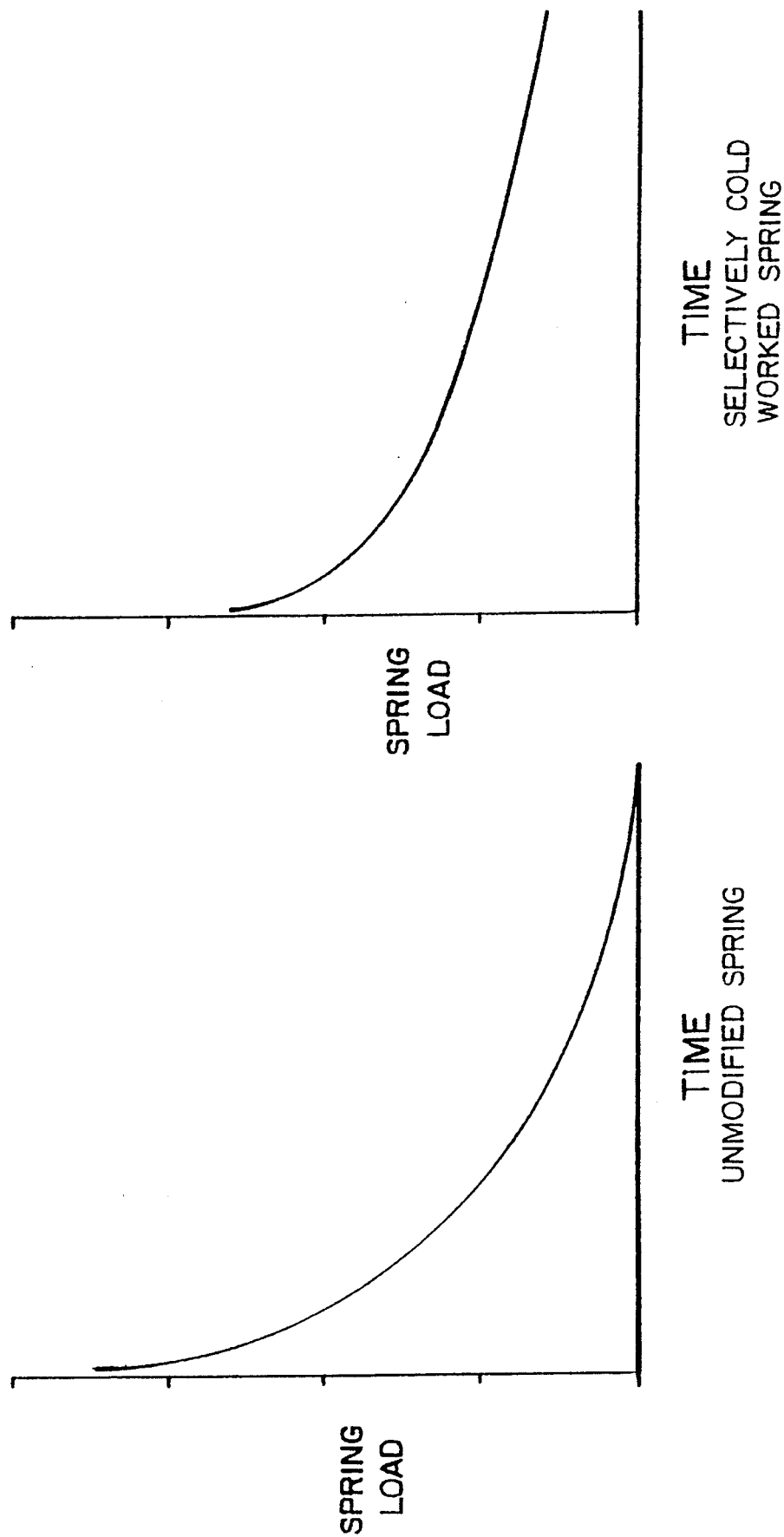
Fig. 4(a) TIME UNMODIFIED SPRING
Fig. 4(b) TIME SELECTIVELY COLD WORKED SPRING

NUCLEAR REACTOR GRID STRIP CANTILEVER SPRING WITH NONUNIFORM MATERIAL CHARACTERISTICS

This is a continuation of copending application Ser. No. 660,805 filed Feb. 26, 1991 now abandoned.

BACKGROUND OF THE INVENTION

The present invention relates generally to metal components and more particularly relates to metal components suitable for use in or near nuclear reactors.

The properties of metal components in a nuclear reactor are affected by radiation exposure. For safety reasons, the extent of irradiation-induced change in reactor parts can be a significant factor in reactor design.

One component of a nuclear reactor system in which consideration of radiation-induced changes is particularly important is in the fuel assembly. In a conventional reactor, the fuel is contained in rods which are grouped together and held in place by fuel assembly grids. The grids are structured to provide an individual channel for each rod. Coolant is circulated through the channels along the outer surface of the fuel rods. Adequate flow of coolant is needed in order to keep the fuel rods from overheating.

Each rod in a fuel assembly grid is held in place within a particular channel by springs, usually cantilever or arched springs. The springs are specially designed to result in minimal disruption to the flow of coolant around the rods, while supporting the rods strongly enough to prevent vibration or longitudinal displacement due to flow forces. Cantilever springs frequently are preferred over arched springs because grids containing cantilever springs have less blockage of coolant flow, and can be made shorter, than grids containing arched springs. Both of these factors contribute to the desirable result of a relatively low pressure drop across grids having cantilever springs. The springs often are made of zircaloy, a zirconium-tin alloy.

Cantilever springs made from zircaloy have a disadvantage, however, in that they tend to relax after only a short period of irradiation. Frequently, the load on the springs decreases to zero during one operational cycle of the fuel assembly. While the use of a high initial load may result in a somewhat longer retention period for a positive spring force, the degree of improvement is not substantial. In any event, the use of springs having a high initial load can be disadvantageous because the fuel rods must be inserted very carefully in order to avoid scoring the cladding of the rods.

SUMMARY OF THE INVENTION

An object of the invention is to provide a metal component which will undergo differential growth upon exposure to a neutron flux.

Another object of the invention is to provide a metal component with improved fatigue resistance and a reduced tendency to crack due to radiation exposure.

Another object of the invention is to provide a treated metal spring which has a smaller loss in spring force when subjected to a neutron flux than an untreated spring of otherwise similar structure and composition.

Yet another object of the invention is to provide a nuclear fuel assembly grid spring made from zircaloy which will allow for relatively easy insertion of a fuel rod against an initial preload, and will maintain sufficient spring force during in-reactor use.

Broadly stated, the present invention is a metal component having non-uniform material characteristics which cause the component to undergo differential growth upon exposure to a neutron flux.

The metal component can be straight or have any number of folds or curves. The component preferably is a curved or bent sheet or rod suitable for use in a nuclear reactor, and more preferably is a cantilever spring. The type of metal and the thickness or cross section of the component are selected such that the shape of the component will change as a result of its differential growth.

"Non-uniform material characteristics" of the component include differences in physical and/or chemical properties of various portions or layers of the component. These differences may be incorporated deliberately in the component at the time of manufacture, or may be brought about by physically and/or chemically treating selected portions of a component which previously had uniform material properties. Preferably, the non-uniformity is obtained by cold working selected portions of a component which previously had uniform material characteristics.

The invention is based upon the inventor's recognition of the potential usefulness of the phenomenon of radiation-induced differential growth, i.e., that portions or layers of a metal component which have different material characteristics undergo different rates of growth upon exposure to a neutron flux. This differential growth occurs whether or not irradiation occurs at a constant temperature. By selecting an appropriate pattern of material characteristics for a particular component, the size and shape of the component can be caused to change in a desired way upon exposure to radiation. The change usually is gradual, and often begins immediately when irradiation commences. For example, when a selectively cold worked metal component is exposed to radiation, the portions of the metal component that have been cold worked "grow" faster than the portions that have not been cold worked. Thus, when a layer on the convex side of a curved metal component is cold worked, but a layer on the directly opposite concave side is not cold worked, the degree of curvature of the component increases upon exposure to radiation. On the other hand, if a layer on the concave side of the curved metal component according to the invention is cold worked, a layer on the directly opposite convex side is not cold worked, the degree of curvature of the component decreases upon exposure to radiation. Changes in shape other than changes in degree of curvature also can be effected according to the invention.

In a preferred embodiment, a conventional cantilever spring is cold worked along the convex side of the curve at the base of the spring, while the directly opposite concave side of the curve is not cold worked. If the selectively cold worked spring is in an unloaded state and is exposed to radiation, the degree of curvature of the spring increases (the radius of curvature decreases) because the cold worked layer on the convex side of the spring "grows" faster than the untreated layer on the concave side of the spring. Along these same lines, if the selectively cold worked spring is loaded with a fuel rod and is exposed to radiation, the spring will exert a force against the loaded object which is due to the differential growth between the adjacent cold worked and untreated layers. This force will at least partially compensate for any relaxation of the spring which may occur due to radiation exposure.

Another feature of the invention is that as a result of the cold working, the fatigue resistance of the component is increased, and cracking of the metal is substantially prevented.

BRIEF DESCRIPTION OF THE DRAWINGS

The objects and features of the present invention will become more apparent from a consideration of the Detailed Description of the Preferred Embodiment, along with the drawings in which:

FIG. 1 is an elevational view of a portion of a wavy interior strip for a nuclear fuel assembly grid having selectively cold worked springs in accordance with the present invention;

FIG. 2 is a top view of the grid strip shown in FIG. 1;

FIG. 3 is an enlarged fragmentary cross-sectional view of a grid spring taken along line 3—3 Of FIG. 1; and FIGS. 4(a) and (b) schematically illustrate the radiation-induced reduction in spring force of a conventional cantilever grid spring and a spring according to the preferred embodiment of the invention, respectively.

DETAILED DESCRIPTION OF THE PREFERRED EMBODIMENT

Referring now to the drawings in detail wherein like numerals represent the same or like parts throughout, and referring particularly to FIGS. 1 and 2, nuclear fuel assembly zircaloy grid strip 10 has a linear series of springs 12 which are cut from sheet 14 and extend outwardly in alternating opposite directions from sheet 14. Springs 12 have an essentially uniform thickness of about 0.018 inches. Each spring 12 has first end 20 which is connected to sheet 14, and opposite second end 22, which is free. As shown in FIGS. 1 and 2, each spring 12 has first curve 24 formed near the first end 20 of spring 12, i.e., near the base of the spring, and second curve 26 formed near second end 22, the first and second curves being in opposite directions. First curve 24 has convex side 30, and opposite concave side 32 which defines a radius of curvature R, shown in FIG. 3. Convex side 30 has cold worked layer 40 having a length extending along the entire length of first end 20 of spring 12, and having a thickness of approximately 0.009 inches, i.e., about half the thickness of spring 12. The width of cold worked layer 40 preferably is sufficient to include all of convex surface 30, and more preferably includes part of the straight or unbent portions of spring 12 and sheet 14 on either side of convex surface 30. Concave surface 32 is not cold worked according to the preferred embodiment of the invention.

Fuel assembly grids (not shown) are formed by interlocking a plurality of grid strips 10 in a conventional way via slots 50, and fastening grid strips 10 using weld tabs 52. Fuel rods (not shown) are mounted in the grids in a conventional manner.

The preferred method of making grid strip 10 is by additionally treating a grid strip which has been conventionally fabricated, with the exception that, before treatment, springs 12 do not extend outwardly as far as the springs in a conventional strip. Untreated strip 10 is masked completely except for the convex surface 30 at the base of each spring 12, and a relatively small portion of the spring and/or sheet proximate convex surface 30 on the convex side of the spring. Strip 10 is then shot peened at appropriate conditions of shot velocity, shot diameter and time in order to cold work the material to a depth of approximately half its thickness. The shot peening causes the curvature of first curve 24 of each spring 12 to increase, so that springs 12 protrude further from the sheet. This change in curvature verifies that the intensity and coverage of the shot peening is appropriate. The mask is removed, and the grid strip is ready to be used.

Suitable process conditions for shot peening a particular type of grid spring can be determined by a conventional technique, e.g., by obtaining an Almen strip which has the same thickness as the grid spring, shot peening the Almen strip at known process parameters, and then cutting the strip to determine the thickness of the cold worked portion. This procedure can be repeated on other Almen strips using different process conditions until a strip is obtained which has a cold worked layer of the appropriate thickness. The process conditions which resulted in the cold worked layer of the desired thickness are then used to shot peen the grid springs.

If selectively cold worked grid strip 10 is placed in a nuclear reactor and is subjected to a neutron flux in an unloaded state, the degree of curvature of springs 12 increases (the radius of curvature of the inner side of the curve decreases), because the metal on the convex side of the curve grows faster than the metal on the concave side. The increase will begin immediately, but will be very gradual.

Alternatively, if springs 12 of strip 10 are loaded with fuel rods and the reactor is operated, springs 12 retain their preload to a greater extent than untreated, but otherwise comparable springs. The improvement in preload retention is obtained because the differential growth of the spring at least partially compensates for the reduction in spring resiliency which results from radiation exposure.

The difference between the reduction in spring force of a conventional spring with time, and the reduction in spring force of the selectively cold worked spring of the present invention with time, is shown schematically in FIGS. 4(a) and 4(b). As illustrated in the Figures, even when the initial load on the selectively cold worked spring is lower than the initial load on the conventional spring, the final load is higher for the selectively cold worked spring than for the conventional spring. When the load of the conventional spring has gone to zero, i.e., after about one reactor cycle, the cold worked spring continues to have a positive load.

It will be appreciated from the foregoing description that a novel and improved nuclear fuel assembly grid spring has been disclosed which has significant advantages over conventional springs. It also will be appreciated that the scope of the invention is intended to include a variety of embodiments of springs and other metal components that are not specifically disclosed. The exact pattern of varied material characteristics, and the techniques used to obtain this variation will depend upon the desired type and degree of differential growth.

What is claimed is:

1. A grid strip for a nuclear reactor fuel assembly, the grid strip having a plurality of loaded metal cantilever springs which grow and relax when subjected to irradiation, each spring having a first end portion connected to the grid strip, a second end portion with an unattached terminal end, a length extending along the spring from the first end to the second end, and a thickness, the first end portion including a first curved portion which is curved in a first direction and the second end portion including a second curved portion which is curved in a second direction which is opposite to the first direction, the first curved portion having a first layer including a convex exterior surface and a second layer including a concave exterior surface, the first and second layers being opposite each other in a direction parallel to the thickness of the spring, the first layer having different material characteristics than the second layer such that upon irradiation of the grid strip the relaxation of the spring is at least partially offset by differential growth of the first and second layers, the second end portion having substantially uniform material characteristics throughout its thickness.

2. A grid strip according to claim 1, wherein the grid strip is formed from a zirconium alloy.

3. A loaded metal nuclear reactor cantilever grid spring which grows and relaxes as a result of irradiation, the spring having a length, a thickness, a supported first end portion and a second end portion with an unsupported terminal end, the first end portion including a first curved portion which is curved in a first direction and the second end portion including a second curved portion which is curved in a second direction which is opposite to the first direction, the first curved portion including a first layer having a convex exterior surface and a second layer having a concave exterior surface, the first and second layers being opposite each other in a direction parallel to the thickness of the spring, the first layer having different material characteristics than the second layer such that upon irradiation of the grid spring, any relaxation in the spring is at least partially offset by differential growth of the first and second layers, the second end portion having a substantially uniform composition and substantially uniform material characteristics throughout its thickness.

4. A spring according to claim 3, wherein the first and second layers have approximately equal thicknesses.

5. A grid spring according to claim 3, wherein the spring is formed from a zirconium alloy.

6. A spring according to claim 3, wherein the convex exterior surface is a shot peened surface and the concave exterior surface is a non-shot peened surface.

7. A process for minimizing the loss in load of a zirconium cantilever spring, the spring having a length, a thickness, a supported first end portion and an opposite second end portion with un unsupported terminal end, the first end portion including a first curved portion which is curved in a first direction and has opposite convex and concave exterior surfaces, the second end portion including a second curved portion which is curved in a second direction which is opposite to the first direction, the process comprising the step of shot peening the convex exterior surface of the first end portion without shot peening the second end portion to form a shot peened layer which extends through only part of the thickness of the first curved portion, the degree of shot peening being sufficient to result in differential growth of the first and second layers of the spring upon exposure to a neutron flux.

8. A process according to claim 7, wherein a portion of the spring is masked during shot peening.

9. In a metal cantilever grid spring for use in a nuclear reactor fuel assembly, the spring being formed from a metal which grows as a result of exposure to radiation and comprising a supported first end portion and a second end portion with an unattached terminal end, the first end portion including a first curved portion which is curved in a first direction and the second end portion including a second curved portion which is curved in a second direction which is opposite to the first direction, the first curved portion including a concave exterior surface and an opposite convex exterior surface, the improvement wherein the first curved portion of the spring includes a first layer including the convex exterior surface and a second layer including the concave exterior surface, the first and second layers each having a length and being opposite each other in a direction parallel to the thickness of the curved portion, the first layer having been specially treated to experience an increase in length upon exposure to a neutron flux which is sufficiently different from the increase in length of the second layer upon exposure to the neutron flux to result in a lower rate of radiation-induced loss in spring load of the spring than the rate of radiation-induced load loss of a spring which does not have a curved portion with a specially treated first layer, the second layer and the second end portion remaining untreated.

10. A spring according to claim 9, wherein the metal comprises a zirconium alloy.

11. A spring according to claim 9, wherein the first layer has a first thickness and the second layer has a second thickness, the first and second thicknesses being approximately equal.

12. A component for use in a nuclear reactor fuel assembly having a cantilevered portion, the cantilevered portion being formed from a metal which grows as a result of exposure to a neutron flux, the cantilevered portion having a length, a thickness, a supported first end portion, and an opposite second portion with an unsupported terminal end, the first end portion including a first curved portion which is curved in a first direction and the second end portion including a second curved portion which is curved in a second direction which is opposite to the first direction, the first curved portion including a first layer having a convex exterior surface and a second layer having a concave exterior surface, the first and second layers being opposite each other in a direction parallel to the thickness of the spring, the first and second layers having different material characteristics such that upon irradiation of the grid spring any relaxation in the spring is at least partially offset by differential growth of the first and second layers, the second end portion having a substantially uniform composition and substantially uniform material characteristics throughout its thickness, the degree of curvature of the first curved portion changing upon exposure to a neutron flux due to differential growth of the first and second layers.

13. A method of making a cantilevered metal component for use in a nuclear reactor, comprising:
obtaining a component which is formed from metal that grows as a result of exposure to radiation, the component having a length, a thickness, a supported first end portion and an opposite second end portion with an unsupported terminal end, the first end portion including a first curved portion which is curved in a first direction and has opposite concave and convex exterior surfaces, the second end portion including a second curved portion which is curved in a second direction which is opposite to the first direction, and cold working the convex exterior surface of the first curved portion without cold working the second end portion to result in the first curved portion having a first degree of curvature and to impart to the first curved portion characteristics sufficient to cause the degree of curvature of the first curved portion to increase to a second degree of curvature upon exposure to a neutron flux.

14. A method according to claim 13, wherein the step of cold working comprises shot peening.

15. A fuel assembly for use in a nuclear reactor, comprising a metal component, the component having a cantilevered portion including:
    an attached first end portion which is connected to a support,
    an opposite second end portion with an unattached terminal end,
    the first end portion including a first curved portion which is curved in a first direction and the second end portion including a second curved portion which is curved in a second direction which is opposite to the first direction, the first curved portion including a shot peened first layer including a convex surface, and a second layer overlapping the first layer in a direction which is parallel to the thickness of the curved portion and including a concave surface, the first layer growing at a different rate than the second layer upon exposure to a neutron flux, the second end portion having substantially uniform material characteristics throughout its thickness.

16. A fuel assembly according to claim 15, wherein the cantilever portion of the metal component is formed from a zirconium alloy.

17. A process for producing a pre-load retaining nuclear reactor grid spring for supporting a fuel rod, comprising the steps of:
    (a) obtaining a grid spring having a length, a thickness, a supported first end portion and an opposite second end portion with an unsupported terminal end, the first end portion including a first curved portion which is curved in a first direction and has opposite concave and convex exterior surfaces, the second end portion including a second curved portion which is curved in a second direction which is opposite to the first direction, and
    (b) shot peening the convex exterior surface of the first curved portion without shot peening the concave exterior surface and the second end portion to form a shot peened layer which extends through only part of the thickness of the first curved portion.

18. A process according to claim 17, further including the step of:
    (c) prior to step (b), masking a portion of the spring surrounding the convex exterior surface of the first curved portion.

* * * * *

UNITED STATES PATENT AND TRADEMARK OFFICE
CERTIFICATE OF CORRECTION

PATENT NO.  : 5,350,161
DATED       : September 27, 1994
INVENTOR(S) : Patrick A. Perrotti It is certified that error appears in the above-indentified patent and that said Letters Patent is hereby corrected as shown below:

Column 6, line 35, after "second" insert --end--.

Signed and Sealed this

Twenty-ninth Day of April, 1997

Attest:

BRUCE LEHMAN

Attesting Officer

Commissioner of Patents and Trademarks